United States Patent
Iwasaki et al.

(10) Patent No.: US 8,025,601 B2
(45) Date of Patent: Sep. 27, 2011

(54) AUTOMATIC TRANSMISSION

(75) Inventors: Tatsuhiko Iwasaki, Kure (JP);
Takamichi Teraoka, Hiroshima (JP);
Shinya Kamada, Kure (JP)

(73) Assignee: Mazda Motor Corporation (JP)

( * ) Notice: Subject to any disclaimer, the term of this patent is extended or adjusted under 35 U.S.C. 154(b) by 357 days.

(21) Appl. No.: 12/243,261

(22) Filed: Oct. 1, 2008

(65) Prior Publication Data
US 2009/0088282 A1    Apr. 2, 2009

(30) Foreign Application Priority Data
Oct. 2, 2007 (JP) .................................. 2007-258329

(51) Int. Cl.
*F16H 57/04* (2010.01)
(52) U.S. Cl. ........................................................ 475/159
(58) Field of Classification Search .................. 475/159, 475/331; 74/467, 468, 606 R; 184/6.12
See application file for complete search history.

(56) References Cited

U.S. PATENT DOCUMENTS
| | | | |
|---|---|---|---|
| 2002/0098943 A1 | 7/2002 | Shultz | |
| 2005/0197226 A1* | 9/2005 | Yamamura et al. | 475/159 |
| 2006/0270513 A1* | 11/2006 | Klemen | 475/275 |
| 2007/0082778 A1 | 4/2007 | Yamamura | |
| 2007/0191176 A1 | 8/2007 | Gumpoltsberger | |
| 2009/0312138 A1* | 12/2009 | Illerhaus et al. | 475/269 |

FOREIGN PATENT DOCUMENTS
| | | |
|---|---|---|
| AT | 86871 B | 1/1922 |
| JP | 2006-214580 | 8/2006 |

OTHER PUBLICATIONS

European Search Report dated May 12, 2009; Application No./Patent No. 08017302.4-1254/ 2045487.

* cited by examiner

*Primary Examiner* — David D Le
*Assistant Examiner* — David J Hlavka
(74) *Attorney, Agent, or Firm* — Studebaker & Brackett PC; Donald R. Studebaker

(57) ABSTRACT

In an automatic transmission, a planetary gear set is disposed adjacently to an end cover and configured such that its inner peripheral face of a carrier is rotatably supported on an outer peripheral face of a boss portion provided at the end cover. A lubricating-oil supply passage comprises an oil passage formed from the end cover to the boss portion, an oil passage formed in the carrier so as to tightly connect to the oil passage at the inner face of the carrier, and an oil passage formed in the pinion shaft so as to tightly connect to the oil passage and reach an outer peripheral face of the pinion shaft. There is provided a lubricating oil supply means for supplying lubricating oil to the bearing portion via the above-descried lubricating-oil supply passage.

6 Claims, 5 Drawing Sheets

|  | 1st clutch (40) | 2nd clutch (50) | 1st brake (60) | 2nd brake (70) | 3rd brake (80) |
|---|---|---|---|---|---|
| 1st gear | O |  | (O) |  |  |
| 2nd gear | O |  |  | O |  |
| 3rd gear | O |  |  |  | O |
| 4th gear | O | O |  |  |  |
| 5th gear |  | O |  |  | O |
| 6th gear |  | O |  | O |  |
| R. gear |  |  | O |  | O |

FIG. 2

AUTOMATIC TRANSMISSION

BACKGROUND OF THE INVENTION

The present invention relates to an automatic transmission which may be installed to automotive vehicles, and in particular, relates to a lubrication structure of its transmission mechanism.

For such an automatic transmission, which achieves a multi-gear shift with selection of power transmission paths of the transmission mechanism, to which an engine output rotation is inputted via a torque converter, by selectively connecting plural frictional elements, it may be a problem how to supply lubricating oil to the rotational elements which constitute the transmission mechanism in order to improve functions, durability and the like.

In an automatic transmission which is described in Japanese Patent Laid-Open Publication No. 2006-214580, for example, for lubrication of a bearing portion of a pinion of a planetary gear set, lubricating oil which flows out of an oil hole, which is formed so as to extend in a radial direction from an oil passage which is formed at a center axis portion so as to extend in an axis direction, due to a centrifugal force is supplied into an oil passage which is formed in a carrier body of the planetary gear set, and then the lubricating oil is supplied to the lubrication portion between the pinion and a pinion shaft via an oil passage which is formed in the pinion shaft so as to extend in an axis direction and an oil hole which is formed so as to extend from the oil passage and reach an outer peripheral face of the pinion shaft.

According to the above-described automatic transmission, however, the lubricating oil having flowed out of the oil hole is discharged into a space in a transmission case, and then part of the lubricating oil is supplied into the oil passage of the carrier body, so that the lubricating oil may be supplied to not only the bearing portion of the pinion but other portions. Therefore, the supply amount of lubricating oil to the bearing portion of the pinion may change in accordance with respective rotational states of the rotational elements of the planetary gear set which include the above-described center axis portion and the like. As a result, there occurs a problem in that in case the pinion rotates at a high speed, the sufficient amount of lubricating oil would not be supplied to the bearing portion of the pinion, resulting in a poor wear resistance for the pinion and the pinion shaft.

SUMMARY OF THE INVENTION

Accordingly, an object of the present invention is to provide an automatic transmission that can properly supply the sufficient amount of lubricating oil to the bearing portion of the pinion of the planetary gear set regardless of the rotational states of the rotational elements of the transmission mechanism and the like, thereby preventing the poor wear resistance for the pinion and the pinion shaft even in case of the high-speed rotation of the pinion.

According to the present invention, there is provided an automatic transmission, comprising a planetary gear set including a sun gear, a ring gear, a carrier to rotatably support a pinion which engages with the sun gear and the ring gear on a pinion shaft; and a lubricating-oil supply passage to supply lubricating oil to a bearing portion between the pinion and the pinion shaft, wherein there is provided a transmission case which comprises a case body having an opening and an end cover to close the opening, the planetary gear set is disposed adjacently to the end cover of the transmission case and configured such that an inner peripheral face of the carrier thereof is rotatably supported on an outer peripheral face of a boss portion which is provided at the end cover so as to extend in an axial direction toward the inside of the case body, the lubricating-oil supply passage comprises a boss-portion-inner oil passage which is formed from the end cover to the boss portion, a carrier-inner oil passage which is formed in the carrier so as to tightly connect to the boss-portion-inner oil passage at the inner face of the carrier, and a shaft-inner oil passage which is formed in the pinion shaft so as to tightly connect to the carrier-inner oil passage and reach an outer peripheral face of the pinion shaft, and there is provided a lubricating oil supply means for supplying lubricating oil to the bearing portion between the pinion and the pinion shaft via the lubricating-oil supply passage.

According to the present invention, the lubricating oil to the bearing portion between the pinion and the pinion shaft of the planetary gear set is supplied via the boss-portion-inner oil passage formed from the end cover to the boss portion, the carrier-inner oil passage formed in the carrier, and the shaft-inner oil passage formed in the pinion shaft. These oil passages are provided so as to connect tightly (i.e., liquid-tightly) respectively, thereby preventing the lubricating oil from discharging into the space in the transmission case. Accordingly, the sufficient amount of lubricating oil can be supplied to the bearing portion between the pinion and the pinion shaft.

Further, the existence of the lubricating oil supply means for supplying the lubricating oil to the bearing portion between the pinion and the pinion shaft via these three lubricating-oil supply passages enables a proper control of the supply amount of the lubricating oil in accordance with the operation state, in particular, the engine speed which is proportional to the rotational speed of the pinion, or in such a manner that the amount of lubricating oil increases at a specified gearshift with a high rotational speed of the pinion, while the amount of lubricating oil decreases at another gearshift requiring less amount of lubricating oil. Thereby, a pumping drive loss caused by unnecessary lubricating-oil over supply can be properly reduced, preventing lack of supply of the lubricating oil when the pinion rotates at the high rotational speed.

According to an embodiment of the present invention, the carrier is configured such that an inner peripheral portion thereof, which is rotatably supported on the outer peripheral face of the boss portion, is longer than an outer portion thereof in the axial direction. Thereby, the carrier and the boss portion contact each other with a wide area, thereby increasing the rigidity of the carrier properly. Accordingly, the carrier can rotate stably around the boss portion. Thus, the properly tight (liquid-tight) connection between the carrier-inner oil passage and the boss-portion-inner oil passage can be maintained, thereby preventing the lubricating oil from leaking improperly.

According to another embodiment of the present invention, the carrier is configured such that an end face of an inner peripheral portion thereof is supported at an end face of the sun gear via a thrust bearing. Thereby, the rigidity of the carrier is increased, the stable contact between the carrier and the boss portion is maintained, and the carrier rotates stably around the boss portion. Thus, the properly tight (liquid-tight) connection between the carrier-inner oil passage and the boss-portion-inner oil passage can be also maintained, thereby preventing the lubricating oil from leaking improperly.

According to another embodiment of the present invention, the carrier is configured such that an end face of an inner peripheral portion thereof is supported at an end face of the end cover of the transmission case via a thrust bearing. Thus, the properly tight (liquid-tight) connection between the carrier-inner oil passage and the boss-portion-inner oil passage can be also maintained, thereby preventing the lubricating oil from leaking improperly.

In general, the number of planetary gear sets constituting the transmission mechanism may increase according to increase of gearshifts. In the six-forward-gear shift, three planetary gear sets may be provided in the axial direction. Herein, the pinion of either one of planetary gear sets may rotate at a very high speed in a specified gear state. In this case, there is a concern that the supply amount of lubricating oil supply to the bearing potion of the pinion would be insufficient to the high-speed rotation of the pinion.

Herein, according to another embodiment of the present invention, the automatic transmission includes a transmission mechanism which achieves the six-forward-gear shift with three planetary gear sets which are disposed in the axial direction, and one of the three planetary gear sets, which is disposed closest to the end cover so as to rotate at the highest gear, constitutes the planetary gear set. Thereby, since the above-described planetary gear set is disposed closest to the end cover, the supply of the sufficient amount of lubricating oil to the bearing portion of the pinion can be ensured with the lubricating-oil passages which tightly connect from the end cover. Accordingly, the lack of the lubricating-oil supply to the pinion with the high-speed rotation can be properly prevented.

According to another embodiment of the present invention, the transmission mechanism of the automatic transmission includes in the transmission case an input shaft, an output member disposed on an axis of the input shaft at a middle portion of the input shaft, first, second and third gear sets, which are a single pinion type of planetary gear set, respectively comprising sun gears, pinions, carriers, and ring gears, wherein the sun gear of the first gear set and the sun gear of the second gear set, the ring gear of the first gear set and the carrier of the second gear set, and the ring gear of the second gear set and the carrier of the third gear set are respectively connected, the sun gear of the third gear set is connected to the input shaft, and the carrier of the first gear set is connected to the output member, a first clutch operative to conduct connection/disconnection between the input shaft and the sun gear of the first gear set and the sun gear of the second gear set, a second clutch operative to conduct connection/disconnection between the input shaft and the ring gear of the first gear set and the carrier of the second gear set, a first brake operative to conduct connection/disconnection between the transmission case and the ring gear of the first gear set and the carrier of the second gear set, a second brake operative to conduct connection/disconnection between the transmission case and the ring gear of the second gear set and the carrier of the third gear set, and a third brake operative to conduct connection/disconnection between the transmission case and the ring gear of the third gear set, wherein the third gear set constitutes the planetary gear set which is disposed closest the end cover.

Other features, aspects, and advantages of the present invention will become apparent from the following description which refers to the accompanying drawings.

BRIEF DESCRIPTION OF THE DRAWINGS

FIG. 2 is a table showing relationships between connection combinations of frictional elements and selected gears.

Hereinafter, a preferred embodiment of the present invention will be described referring to the accompanying drawings.

DETAILED DESCRIPTION OF THE INVENTION

Figure 1:
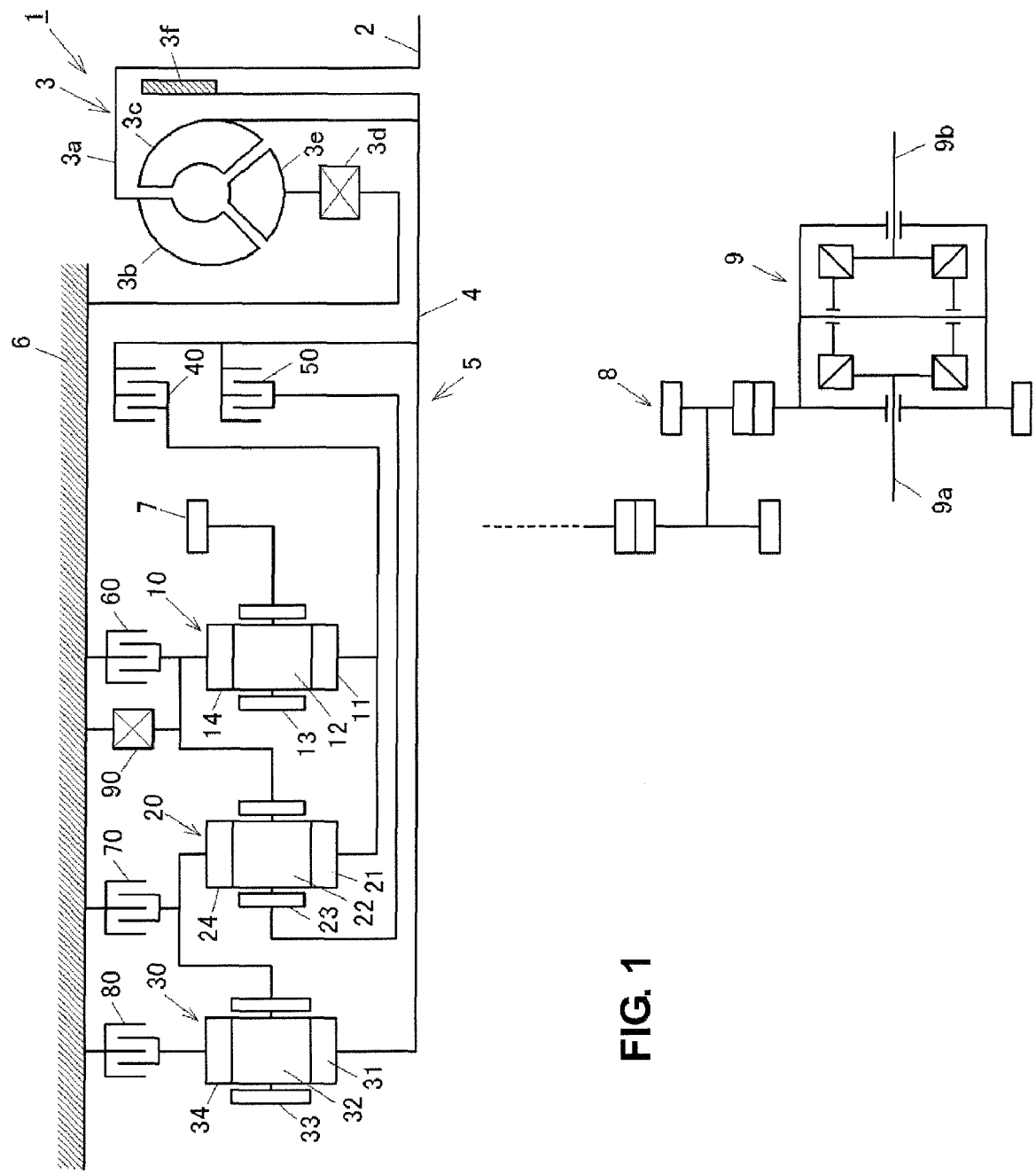
FIG. 1 is a skeleton diagram of an automatic transmission according to an embodiment of the present invention.

FIG. 1 is a skeleton diagram of an automatic transmission according to the present embodiment of the present invention. The present automatic transmission 1, which is applied to an automotive vehicle with a laterally disposed engine, such as a front-engine front-drive type of vehicle, comprises a torque convertor 3 attached to an engine output shaft 2 and a transmission mechanism 5 to which an output rotation of the torque convertor 3 is inputted via an input shaft 4. The transmission mechanism 5 is accommodated in a transmission case 6 and disposed on an axis of the input shaft 4.

An output rotation of the transmission mechanism 5 is transmitted from an output gear 7, which is disposed on the axis of the input shaft 4 at its middle portion, to a differential gear 9 via a counter drive mechanism 8, thereby driving right and left drive axels 9a, 9b.

The torque convertor 3 comprises a case 3a which is connected to the engine output shaft 2, a pump 3b which is fixed in the case 3a, a turbine 3c which is disposed facing to the pump 3b and driven by the pump 3b with operational oil, a stator 3e which is provided between the pump 3b and the turbine 3c and supported at the transmission case 6 via a one-way clutch so as to achieve a torque increase function, and a lockup clutch 3f which is provided between the case 3a and the turbine 3c and connects the engine output shat 2 to the turbine 3c directly via the case 3a. Thereby, the rotation of the turbine 3c is transmitted to the transmission mechanism 5 via the input shaft 4.

Meanwhile, the transmission mechanism 5 comprises first, second and third planetary gear sets 10, 20, 30 (hereinafter, referred to as "first, second and third gear sets"). These gear sets 10, 20, 30 are disposed in the transmission case 6 on an anti-torque convertor side of the output gear 7 in order.

Further, a first clutch 40 and a second clutch 50, as frictional elements constituting the transmission mechanism 5, are disposed on the torque converter side of the output gear 7. On the anti-torque convertor side of the output gear 7 are disposed a first brake 60, a second brake 70, and a third brake 80 in order from the torque convertor side. Also, a one-way clutch 90 is disposed beside the first brake 60.

The first, second and third gear sets 10, 20, 30, which are a single pinion type of planetary gear set, respectively comprise sun gears 11, 21, 31, plural pinions 12, 22, 32 to engage with the sun gears 11, 21, 31, carriers 13, 23, 33 to support the pinions 12, 22, 32 respectively, and ring gears 14, 24, 34 to engage with the pinions 12, 22, 32.

The input shaft 4 is connected to the sun gear 31 of the third gear set 30. The sun gear 11 of the first gear set 10 and the sun gear 21 of the second gear set 20, the ring gear 14 of the first gear set 10 and the carrier 23 of the second gear set 20, and the ring gear 24 of the second gear set 20 and the carrier 33 of the third gear set 30 are connected, respectively. The output gear 7 is connected to the carrier 13 of the first gear set 10.

The sun gear 11 of the first gear set 10 and the sun gear 21 of the second gear set 20 are connected to the input shaft 4 via the first clutch 40. The carrier 23 of the second gear set 20 is connected to the input shaft 4 via the second clutch 50.

Further, the ring gear 14 of the first gear set 10 and the carrier 23 of the second gear set 20 are connected to the transmission case 6 via the first brake 60 and the one-way clutch 90. The ring gear 24 of the second gear set 20 and the carrier 33 of the third gear set 30 are connected to the transmission case 6 via the second brake 70. The ring gear 34 of the third gear set 30 is connected to the transmission case 6 via the third brake 80.

The transmission mechanism 5 having the above-described structure achieves shifts for the six-forward gears and a reverse gear by combination of connection of the first and second clutches 40, 50 and the first, second and third brakes 60, 70, 80. Relationships between the combination and the selected gears are shown in FIG. 2.

That is, the first clutch 40 and the first brake 60 are connected to each other in the first gear, where the rotation of the input shaft 4 is inputted to the sun gear 11 of the first gear set 10 with a great speed reduction by the first gear set 10, and then outputted from the carrier 13 of the first gear set 10 to the output gear 7. Herein, the first brake 60 is connected only in the first gear state where the engine brake works. In the first gear state where the engine brake does not work, the one-way clutch 90 is locked up for accomplishing the first gear.

In the second gear, the first clutch 40 and the second brake 70 are connected to each other, where the rotation of the input shaft 4 is inputted to the sun gear 11 of the first gear set 10 and at the same time inputted to the ring gear 14 of the first gear set 10 via the second gear set 20 with a smaller ratio of speed reduction than the first gear, and then outputted from the carrier 13 of the first gear set 10 to the output gear 7.

In the third gear, the first clutch 40 and the third brake 80 are connected to each other, where the rotation of the input shaft 4 is inputted to the sun gear 11 of the first gear set 10 and at the same time inputted to the ring gear 14 of the first gear set 10 via the second gear set 20 with a smaller ratio of speed reduction than the second gear, and then outputted from the carrier 13 of the first gear set 10 to the output gear 7.

In the fourth gear, the first clutch 40 and the second clutch 50 are connected to each other, where the rotation of the input shaft 4 is inputted to the sun gear 11 of the first gear set 10 and at the same time inputted to the ring gear 14 of the first gear set 10 via the second gear set 20 directly. Thereby, the whole first gear set 10 rotates along with the input shaft 4, so that the rotation of the input shaft 4 is outputted from the carrier 13 to the output gear 7 with the speed reduction ratio of 1.

In the fifth gear, the second clutch 50 and the third brake 80 are connected to each other, where the rotation of the input shaft 4 is inputted to the ring gear 14 of the first gear set 10 via the second gear set 20 directly and at the same time inputted to the sun gear 11 of the first gear set 10 via the third gear set 30 and the second gear set 20. Thereby, the rotation of the input shaft 4 is outputted from the carrier 13 of the first gear set 10 to the output gear 7 with the speed increase.

In the sixth gear, the second clutch 50 and the second brake 70 are connected to each other, where the rotation of the input shaft 4 is inputted to the ring gear 14 of the first gear set 10 via the second gear set 20 directly and at the same time inputted to the sun gear 11 of the first gear set 10 via the second gear set 20. Thereby, the rotation of the input shaft 4 is outputted from the carrier 13 of the first gear set 10 to the output gear 7 with a greater speed increase ratio than the fifth gear.

Further, in the reverse gear, the first brake 60 and the third brake 80 are connected, where the rotation of the input shaft 4 is inputted to the sun gear 11 of the first gear set 10 via the second gear set 20 and the third gear set 30. Herein, the rotational direction is reversed by the second gear set 20, so that the rotation of the input shaft 4 is outputted from the carrier 13 of the first gear set 10 to the output gear 7 with a reverse rotation.

As described, the transmission mechanism 5 of the present embodiment comprises three single-pinion type of planetary gear sets 10, 20, 30 and the five frictional elements 40, 50, 60, 70, 80 and achieves shifts for the six-forward gears and the reverse gear with these components.

Figure 3:
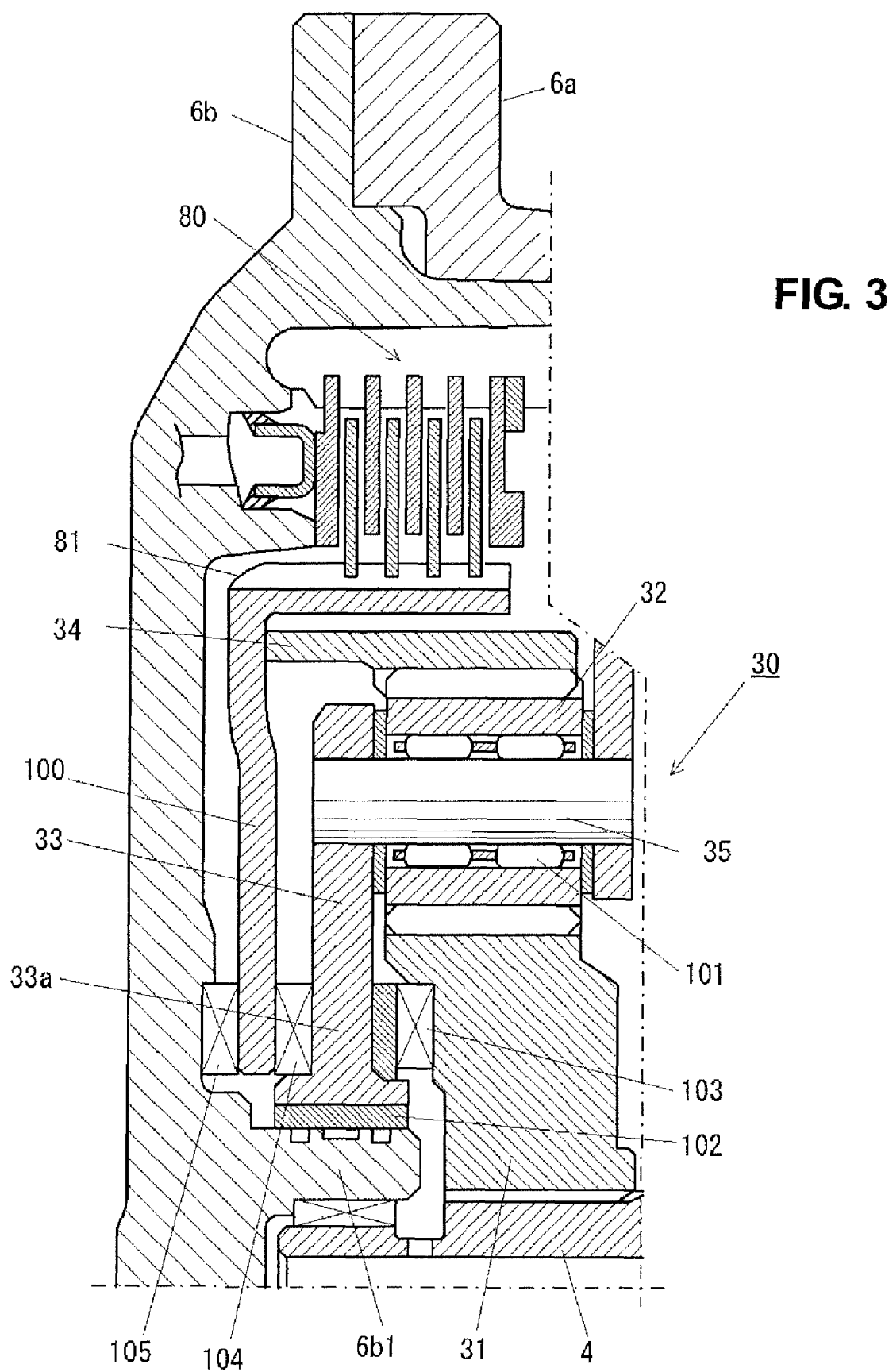
FIG. 3 is a sectional view of a third gear set and its surrounding.
Figure 4:
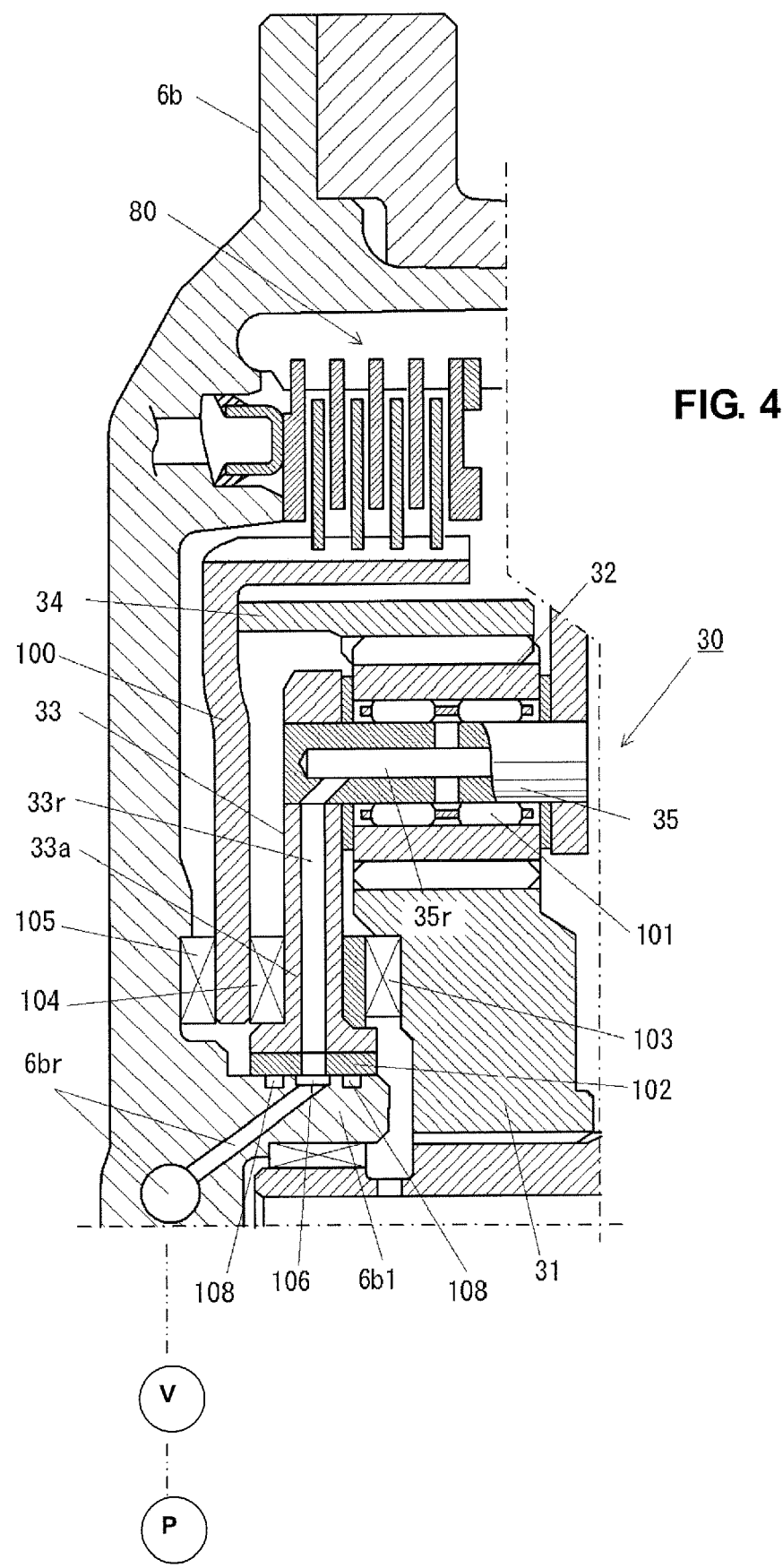
FIG. 4 is a sectional view of another third gear set and its surrounding, which shows lubricating oil passages.

Hereinafter, the specific structure of the third gear set 30 and its surrounding which are disposed on the rear side of the transmission mechanism 5, which are features of the present invention, will be described referring to FIGS. 3 and 4. FIGS. 3 and 4 are sectional views of an identical portion of the transmission mechanism 5 in the axis direction, taken along different lines in a peripheral direction from each other.

As shown in FIG. 3, the transmission case 6 comprises a body case 6a to accommodate the transmission mechanism 5 and an end cover 6b to close the opening of a rear end face of the body case 6a.

Near the end cover 6b are respectively disposed the third gear set 30 on the inner peripheral side and the third brake 80 on the outer peripheral side.

The sun gear 31 of the third gear set 30 engages with the input shaft 4 via spline connection. The ring gear 34 is supported at a support plate 100 on the end cover side. The outer-peripheral side end of the support plate 100 forms a hub 81 of the third brake 80.

The pinion 32 which engages with the sun gear 31 and the ring gear 34 is rotatably supported on a pinion shaft 35, which the carrier 33 supports, via a bearing 101.

The carrier 33 is supported via a bearing member 102 such that the inner peripheral face of a tip of its inner peripheral portion 33a engages with the outer peripheral face of the boss portion 6b1 which extends toward the inside of the case 6a from the inner peripheral side of the end cover 6b in the axial direction. This bearing member 102, which is cylindrical, is made of a self-lubricating material, and fixed to the carrier 33.

The carrier 33 is configured such that its inner peripheral portion 33a is longer than its outer portion the axial direction. The reason for this will be described later.

Further, the carrier 33 is supported at an end face of the sun gear 31 via a bearing 103 on the sun-gear side of the inner peripheral portion 33a. The carrier 33 is further supported at the support plate 100 via a bearing 104 at a position which faces to the bearing 103 (on the anti-sun-gear side). Herein, the support plate 100 is also supported at an end face of the end cover 6b via a bearing 105 which faces to the bearing 104. Accordingly, the carrier 33 is supported at the end cover 6b via the two bearings 103, 104 and the support plate 100 provided between the bearings. The reason for this will be described later.

FIG. 4 is a sectional view showing oil passages for supplying the lubricating oil to the bearing portion (bearing 101) between the pinion 32 and the pinion shaft 35.

As shown in FIG. 4, the lubricating-oil supply passage for supplying the lubricating oil to the bearing portion (bearing 101) between the pinion 32 and the pinion shaft 35 comprises an oil passage 6br (boss-portion-inner oil passage) which is formed from the end cover 6b to the boss portion 6b1, an oil passage 33r (carrier-inner oil passage) which is formed in the carrier 33 (additionally, the bearing member 102) so as to connect to an oil passage 6br, and an oil passage 35r (shaft-inner oil passage) which is formed in the pinion shaft 35 so as to connect to the oil passage 33 and reach the outer peripheral face of the pinion shaft 35.

The oil passage 6br in the boss portion 6b1 and the oil passage 33r in the carrier 33 are formed so as to tightly connect to each other. Specifically, an oil groove 106 is formed around the outer peripheral face of the boss portion 6b1 in the peripheral direction, and the oil passage 6br connects to this oil groove 106. The oil passage 33r of the carrier 33 which rotates around the boss portion 6b1 receives the supply of lubricating oil from the oil passage 6br via the oil groove 106. Further, seal rings 108 are disposed on both sides in the axial direction of the oil groove 106. Thereby, the lubricating oil flowing from the oil passage 6br to the oil passage 33r is prevented from discharging into the space in the transmission case 6 from the portion between the boss portion 6b1 and the carrier 33 (specifically, the bearing member 102).

Further, the carrier 33 is configured such that the inner peripheral portion 33a is longer than the outer portion in the axial direction as described above. Thereby, the carrier 33 and the boss portion 6b1 contact each other with a wide area, thereby increasing the rigidity of the carrier 33 properly. Accordingly, the carrier 33 can rotate stably around the boss portion 6b1. Thus, the properly tight connection between the oil passage 33r of the carrier 33 and the oil passage 6br of the boss portion 6b1 can be maintained, thereby preventing the lubricating oil from leaking improperly.

In addition, as described above, the carrier 33 is supported at the end face of the sun gear 31 via the bearing 103 on the sun-gear side of the inner peripheral portion 33a, and the carrier 33 is supported at the end cover 6b via the two bearings 103, 104 and the support plate 100 provided between the bearings at the position facing to the bearing 103 (on the anti-sun-gear side of the inner peripheral portion 33a). Thereby, the support rigidity of the carrier 33 is further increased, and the carrier 33 rotates around the boss portion 6b1, maintaining the stable contact between the carrier 33 and the boss portion 6b1. Thus, the properly tight connection between the oil passage in the carrier 33 and the oil passage in the boss portion 6b1 can be maintained, thereby properly preventing the lubricating oil from leaking improperly.

Meanwhile, the oil passage 33r in the carrier 33 and the oil passage 35r in the pinion shaft 35 are formed so as to tightly connect to each other. Herein, since the carrier 33 and the pinion shaft 35 rotate together around the axis of the input shaft 4, the above-described seal ring may not be necessary, and thus the proper tight connection is maintained by the structure in which the pinion shaft 35 is inserted in and fixed to the carrier 33.

The oil passage 6br, which is formed from the end cover 6b to the boss portion 6b1, is connected to an oil pump P via a valve V (lubricating oil supply means). The lubricating oil is supplied to the portion (bearing 101) between the pinion 32 and the pinion shaft 35 by controlling the valve V (with a control unit (not illustrated) operated, for example). Thereby, the lubricating oil with the controlled supply amount from the valve V is only supplied to the bearing 101 via the three oil passages 6br, 33r, 35r, without being supplied to other portions in the transmission case 6. In other words, the valve V and the three oil passages 6br, 33r, 35r may be provided substantially only for the supply of the lubricating oil to the bearing 101. As a result, the sufficient amount of lubricating oil can be supplied to the bearing 101 between the pinion 32 and the pinion shaft 35.

Herein, the supply amount of lubricating oil may be possibly controlled in accordance with the rotational speed of the pinion 32 (proportional to the engine speed) or in such a manner that the supply amount decreases at a specified gear-shift requiring less amount of lubricating oil. Thereby, a pumping drive loss caused by unnecessary lubricating-oil over supply can be properly reduced, preventing lack of supply of the lubricating oil when the pinion 32 rotates at the high rotational speed.

In the above-described embodiment, the driving state is the first gear where the pinion 32 rotates at the high speed.

Figure 5:
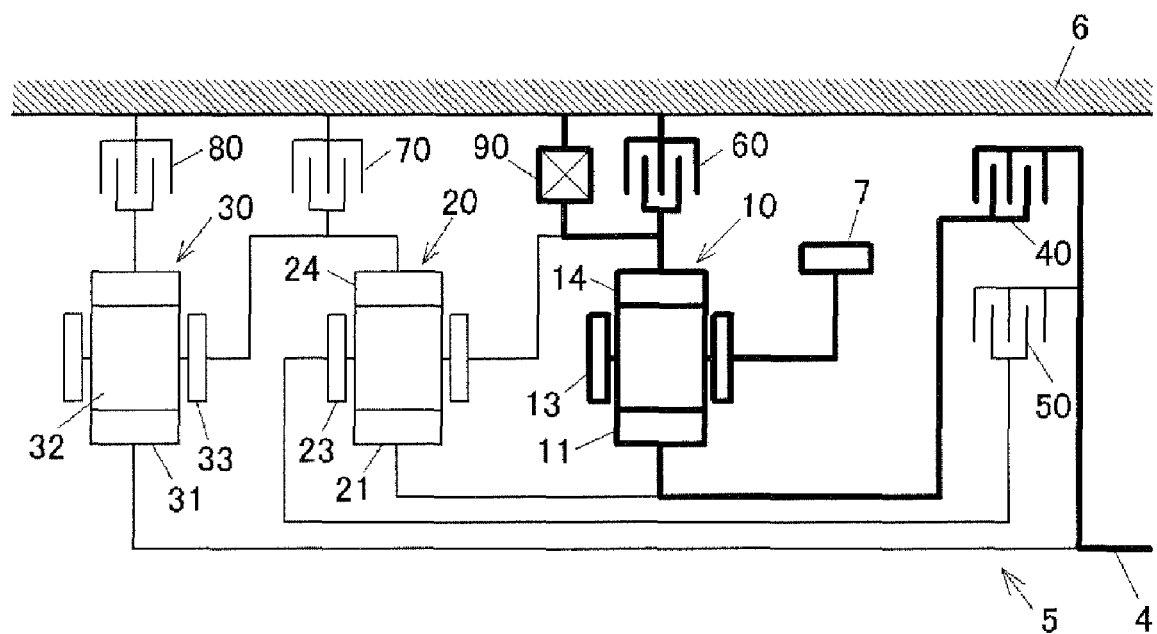
FIG. 5 is a skeleton diagram of a major portion, which shows a first gear state.

Specifically, as shown by the torque transmission paths indicated with bold lines in FIG. 5, in the first gear, the carrier 23 is fixed with the first brake 60 in the second gear set 20, and the rotation of the input shaft 4 is inputted to the sun gear 21. As a result, the ring gear 24 rotates in the reverse direction, which is opposite to the rotational direction of the input shaft 4. Then, this reverse rotation is inputted to the carrier 33 of the third gear set 30. Thus, in the third gear set 30, the rotation of the input shaft 4 is inputted to the sun gear 31 and the reverse rotation is inputted to the carrier 33.

Herein, the pinion 32 may rotate at a very high speed without transmitting a power, so that there is a concern that the pinion 32 and the pinion shaft 35 would get worn improperly in an early stage. Accordingly, the sufficient amount of lubricating oil is supplied to the bearing potion between the pinion 32 and the pinion shaft 35 via the three oil passages 6br, 33r, 35r in the present embodiment.

The present invention should not be limited to the above-described embodiments.

For example, the present invention may be applied to any automatic transmission having at least one planetary gear set. The advantages of the present invention, however, may be provided effectively by the automatic transmission having the pinion which rotates at the high speed. In this case, like the above-described embodiment, the layout of the planetary gear set with the pinion rotating at the high speed which is disposed closest to the end cover enables the sufficient amount of lubricating-oil supply to the bearing portion between the pinion and the pinion shaft via the lubricating-oil supply passages tightly connecting to each other from the end cover.

What is claimed is:

1. An automatic transmission coupled to an engine laterally disposed in a vehicle, comprising;
a plurality of gear sets, each of which includes a sun gear, a ring gear, a carrier to rotatably support a pinion which engages with the sun gear and the ring gear on a pinion shaft;
a lubricating-oil supply passage to supply lubricating oil to a bearing portion between the pinion and the pinion shaft;
a transmission case including a case body having an opening positioned on an opposite side to the engine and an end cover fixed to the case body to close the opening, one of said planetary gear sets, which has the pinion to rotate at a highest speed, is disposed closest to the end cover of the transmission case and configured such that an inner peripheral face of the carrier thereof is rotatably supported on an outer peripheral face of a boss portion provided at the end cover to extend in an axial direction toward the inside of the case body, said lubricating-oil supply passage includes a boss-portion-inner oil passage formed from the end cover to the boss portion, a carrier-inner oil passage formed in the carrier to tightly connect to the boss-portion-inner oil passage at the inner face of the carrier, and a shaft-inner oil passage formed in the pinion shaft to tightly connect to the carrier-inner oil passage and reach an outer peripheral face of the pinion shaft; and a lubricating oil supply to supply lubricating oil to the bearing portion between the pinion and the pinion shaft via said lubricating-oil supply passage.

2. The automatic transmission of claim 1, wherein said carrier is configured such that an inner peripheral portion thereof, which is rotatably supported on the outer peripheral face of the boss portion, is longer than an outer peripheral portion thereof in the axial direction.

3. The automatic transmission of claim 2, wherein said carrier is configured such that an end face of the outer peripheral portion thereof is supported at an end face of the sun gear via a thrust bearing.

4. The automatic transmission of claim 2, wherein said carrier is configured such that an end face of the outer peripheral portion thereof is supported at an end face of the end cover of the transmission case via a thrust bearing.

5. The automatic transmission of claim 1, wherein said automatic transmission includes a transmission mechanism which achieves a six-forward-gear shift with three planetary gear sets disposed in the axial direction, and one of the three planetary gear sets which has the pinion to rotate at the highest speed is disposed closest to the end cover.

6. The automatic transmission of claim 5, wherein the transmission mechanism of the automatic transmission includes in the transmission case:
   an input shaft;
   an output member disposed on an axis of the input shaft at a middle portion of the input shaft;
   first, second and third gear sets constituting said plurality of gear sets, which are a single pinion type of planetary gear set, respectively comprising sun gears, pinions, carriers, and ring gears, wherein the sun gear of the first gear set and the sun gear of the second gear set, the ring gear of the first gear set and the carrier of the second gear set, and the ring gear of the second gear set and the carrier of the third gear set are respectively connected, the sun gear of the third gear set is connected to the input shaft, and the carrier of the first gear set is connected to the output member;
   a first clutch operative to conduct connection/disconnection between the input shaft and the sun gear of the first gear set and the sun gear of the second gear set;
   a second clutch operative to conduct connection/disconnection between the input shaft and the ring gear of the first gear set and the carrier of the second gear set;
   a first brake operative to conduct connection/disconnection between the transmission case and the ring gear of the first gear set and the carrier of the second gear set;
   a second brake operative to conduct connection/disconnection between the transmission case and the ring gear of the second gear set and the carrier of the third gear set; and
   a third brake operative to conduct connection/disconnection between the transmission case and the ring gear of the third gear set,
   wherein said first clutch and said first brake are connected to each other in a first gear, where the pinion of said third gear set, which is disposed closest to the end cover, rotates at a high speed without transmitting power.

* * * * *